(12) United States Patent
Dawson

(10) Patent No.: US 7,136,069 B1
(45) Date of Patent: Nov. 14, 2006

(54) METHOD AND SYSTEM FOR TEXTURING

(75) Inventor: Thomas Patrick Dawson, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 987 days.

(21) Appl. No.: 09/703,020

(22) Filed: Oct. 31, 2000

(51) Int. Cl.
G09G 5/00 (2006.01)

(52) U.S. Cl. .................. 345/582; 345/211; 345/430; 345/552

(58) Field of Classification Search ............. 345/211, 345/582, 552, 430
See application file for complete search history.

(56) References Cited

U.S. PATENT DOCUMENTS

| | | | |
|---|---|---|---|
| 5,719,599 A | 2/1998 | Yang | 345/430 |
| 5,828,382 A | 10/1998 | Wilde | 345/501 |
| 5,877,769 A | 3/1999 | Shinohara | 345/425 |
| 5,886,701 A * | 3/1999 | Chauvin et al. | 345/418 |
| 5,886,706 A | 3/1999 | Alcorn et al. | 345/430 |
| 5,953,015 A | 9/1999 | Choi | 345/430 |
| 5,973,701 A | 10/1999 | Vaswani | 345/430 |
| 5,987,567 A | 11/1999 | Rivard et al. | 711/118 |
| 6,002,407 A | 12/1999 | Fadden | 345/430 |
| 6,005,583 A | 12/1999 | Morrison | 345/430 |
| 6,040,837 A | 3/2000 | Wong et al. | 345/430 |
| 6,046,747 A | 4/2000 | Saunders et al. | 345/430 |
| 6,057,850 A | 5/2000 | Kichury | 345/430 |
| 6,057,861 A | 5/2000 | Lee et al. | 345/507 |
| 6,229,553 B1 * | 5/2001 | Duluk, Jr. et al. | 345/506 |
| 6,239,807 B1 * | 5/2001 | Bossut | 345/582 |
| 6,295,068 B1 * | 9/2001 | Peddada et al. | 345/419 |

* cited by examiner

*Primary Examiner*—Kee M. Tung
(74) *Attorney, Agent, or Firm*—Mayer & Williams PC; Karin L. Williams, Esq.

(57) ABSTRACT

A method and system for texturing. The texturing system is configured to render surfaces that have an apparent thickness, where the upper layers of the surface are partially transparent and sub-surface details show through the upper layers. Interpolated stepping values provide parallax between various texture layers. The texturing system also provides a texture memory configured to store texture data as a plurality of packets. Each packet comprises texture data from at least two texture layers. A texture memory controller is configured to access one or more packets in the texture memory and pass the packets to a texturing engine.

40 Claims, 7 Drawing Sheets

METHOD AND SYSTEM FOR TEXTURING

BACKGROUND OF THE INVENTION

1. Field of the Invention

The present invention relates to generating graphics. Specifically, the present invention relates to a method and system for texturing.

2. Description of Related Art

In computer graphics, existing texture-rendering techniques map a pixel on a screen (typically using screen coordinates (x, y)) to a polygon, such as a triangle, on a surface in a viewing plane (typically using geometric or surface coordinates (s, t)). The polygon is rasterized into a plurality of smaller pieces called fragments. Each polygon may have information, such as color and/or a normal vector, associated with each vertex of the polygon. To assign a texture (i.e., a color pattern or image, either digitized or synthesized) to a fragment, the fragment is mapped onto a texture map (typically using texture coordinates (u, v)). Texture maps are stored in a texture memory. A texture map represents a type of image, such as stripes, check.erboards, or complex patterns that characterize natural materials. A texture map comprises a plurality of texels. A texel is the smallest graphical element in a 2-D texture map used to render a 3-D object.

Each texture map has a plurality of associated MIP (multum in parvo) maps, which are abbreviated versions of a full texture map. One of the MIP maps may be selected to provide a suitable resolution for the fragment of the polygon in the viewing plane. The texture from the selected MIP map is applied onto the fragment. The applied texture may be blended with a color already associated with the fragment or polygon.

Existing texture-rendering techniques are able to model a simple opaque surface, but are unable to accurately render a semi-opaque surface, where the upper layers of the surface are partially transparent, and reveal sub-surface details. A semi-opaque surface is not transparent in that an object behind the surface will not show through it. The transparency of a semi-opaque surface applies to the upper layers of the surface, as the upper layers allow details from the lower surface layers to appear.

Existing texture-rendering techniques cannot account for surface thickness without either explicitly modeling all of the surface layers individually or by mathematically calculating the contents of the entire three-dimensional volume that encloses the surface. Both of these techniques require additional hardware and/or software and may require a longer processing time.

Another problem with conventional texturing systems is the need to make multiple passes in order to apply multiple textures to a fragment, which is called 'multi-texturing.' Conventional texturing systems can only access and read one texture image (a MIP map set) at a time. For multi-texturing, conventional texturing systems must make multiple passes, i.e., read a first texture image, then a second texture image, then a third texture image, etc. After all the texture images have been read, conventional systems typically separate the texel data into individual components and combine the color components from each texture image to produce a blended color to apply to a fragment.

The multiple passes and other processes of conventional systems require a long processing time, which is undesirable to the user.

SUMMARY

The present invention relates to a method and system for texturing. One aspect of the texturing system advantageously allows a hardware- or software-based polygon texturing engine to render surfaces that have an apparent thickness (i.e., surface depth), where the upper layers are partially transparent and sub-surface details at least partially show (i.e., become visible) through the upper layers.

There are many opaque surfaces that have layered partial transparency, such as Opal, Aragonite, Pectolite and other minerals and gemstones. For example, the present texturing system and method may be used to render an emperor's throne made of opal in a fantasy-based computer game. Some types of plastic and thickly-layered metal flake paint also exhibit this semi-opaque surface quality. Other layered materials include biological tissues (e.g., skin, leaves, etc.) or inorganic materials (e.g., snow, sand, paint, varnished or dusty surfaces).

The texturing system advantageously does not require additional polygon modeling or volumetric analysis and calculations to create the appearance of surface depth, as required in existing systems. In addition, when the surface does not have a depth component, the texturing system advantageously allows multiple textures to be applied in a single pass by a texturing engine. Thus, the texturing system minimizes the inefficiency of multi-pass rendering associated with conventional systems.

In one embodiment, the texturing system is implemented in a real-time, hardware-based rendering system, such as a graphics-rendering card. In another embodiment, the texturing system is implemented in a software-based rendering system.

One embodiment of the method for surface depth texturing comprises determining a depth stepping angle, the depth stepping angle formed by a first vector from an eye point position to a fragment in a polygon surface and a second vector normal to the surface of the fragment; converting the depth stepping angle to one or more texel offset values; applying the texel offset values to a first texel in a first texture layer to find a corresponding second texel in a second texture layer; blending one or more color values and one or more alpha values associated with the first and second texels to create an apparent surface depth for the fragment; and applying the blended color values and alpha values to the fragment.

One embodiment of the surface-depth texturing system comprises a texturing engine and a texturing memory coupled to the texturing engine. The texturing engine is configured to retrieve a first texel in a first texture layer from the texture memory; determine a depth stepping angle between a first vector from an eye point position to a fragment in a polygon surface and a second vector normal to the surface of the fragment; convert the depth stepping angle to one or more texel offset values; apply the texel offset values to the first texel to find a corresponding second texel in a second texture layer; blend one or more color values and one or more alpha values associated with the first and second texels to create an apparent surface depth for the fragment; and apply the blended color values and alpha values to the fragment.

Another aspect of the texturing system provides a novel way of organizing texture memory and the addition of control registers and lookup tables to existing texturing hardware. The texture memory format advantageously avoids the inconvenience and delay of memory page swapping in conventional texture memory systems.

One embodiment of the texturing system comprises a texture memory controller coupled to a texturing engine and a texture memory. The texture memory is configured to store texture data as a plurality of packets. Each packet comprises texture data from at least two texture layers. The texture memory controller is configured to access one or more packets in the texture memory and pass the packets to the texturing engine.

One embodiment of a method for managing texture data comprises storing a texture map set in a texture memory, where the texture map set comprising two or more texture layers.

The present invention will be more fully understood upon consideration of the detailed description below, taken together with the accompanying drawings.

BRIEF DESCRIPTION OF THE DRAWINGS

Use of the same reference symbols in different figures indicates similar or identical items.

DETAILED DESCRIPTION

Figure 1A:
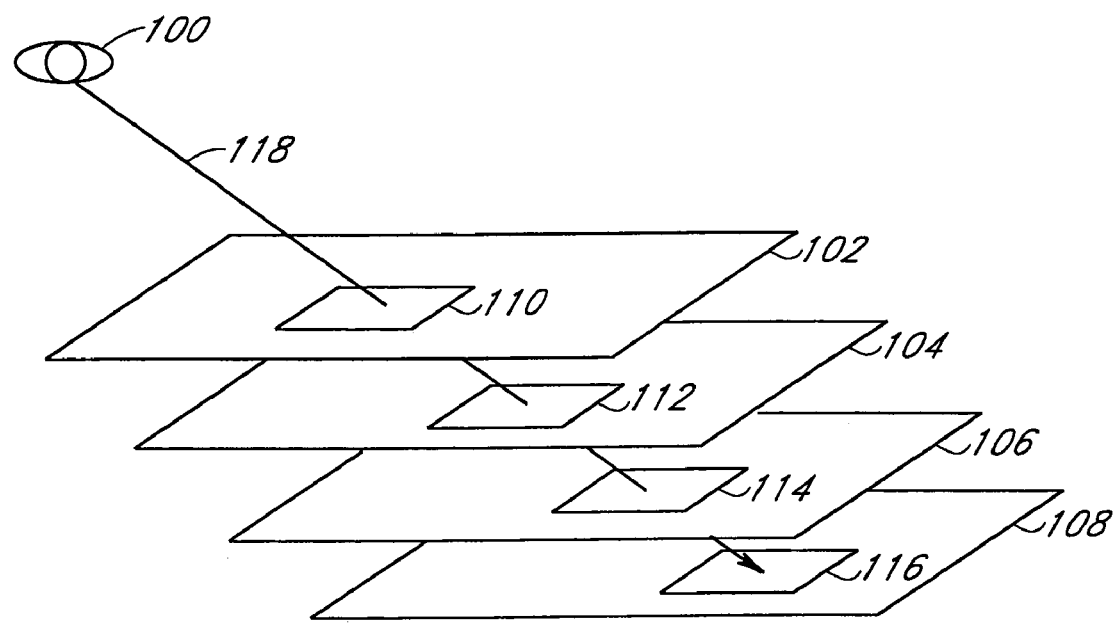
FIG. 1A illustrates a first eye point position above a plurality of texture layers.

FIG. 1A illustrates a first eye point position 100 above a plurality of texture layers comprising a first texture layer 102, a second texture layer 104, a third texture layer 106, and a fourth texture layer 108. Each texture layer 102, 104, 106, 108 comprises a texture map with all of its associated MIP (multum in parvo) maps. Texture mapping is described in "Computer Graphics Principles and Practice" by James D. Foley et al., 1997, on pages 741–744, and "Introductive Computer Graphics, A top-down approach with OpenGL" by Edward Angel, 1997, pages 389–397, which are hereby incorporated by reference in their entirety. MIP mapping is described on pages 826–828 of "Computer Graphics Principles and Practice."

Each texture map comprises a plurality of texels. FIG. 1A illustrates a first texel 110 in the first texture layer 102, a second texel 112 in the second texture layer 104, a third texel 114 in the third texture layer 106 and a fourth texel 116 in a fourth texel layer 108. The first, second, third and fourth texels 110, 112, 114, 116 are associated with an eye point vector 118.

In FIG. 1A, an illusion of depth at the first eye point 100 is achieved through blending values that are used to combine the first, second, third and fourth texels 110, 112, 114, 116 chosen from four texture layers 102, 104, 106, 108 and from a parallax created between the different layers 102, 104, 106, 108. Parallax is the apparent change in view as the eye point 100 changes position, which provides a new line of sight.

Figure 1B:
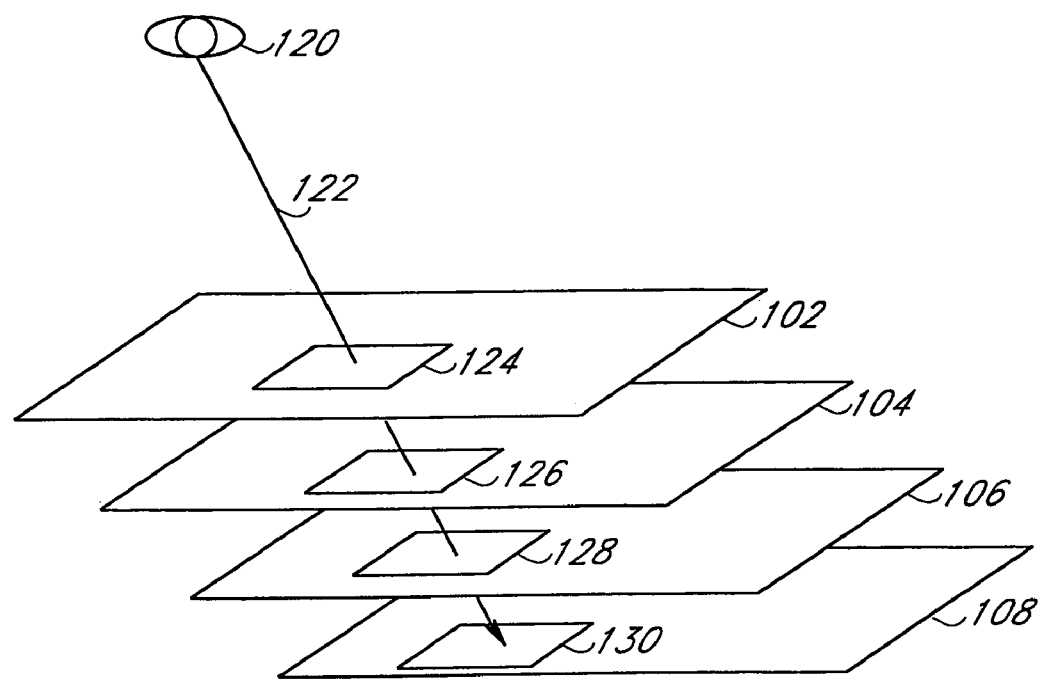
FIG. 1B illustrates a second eye point position above a plurality of texture layers.
Figure 2:
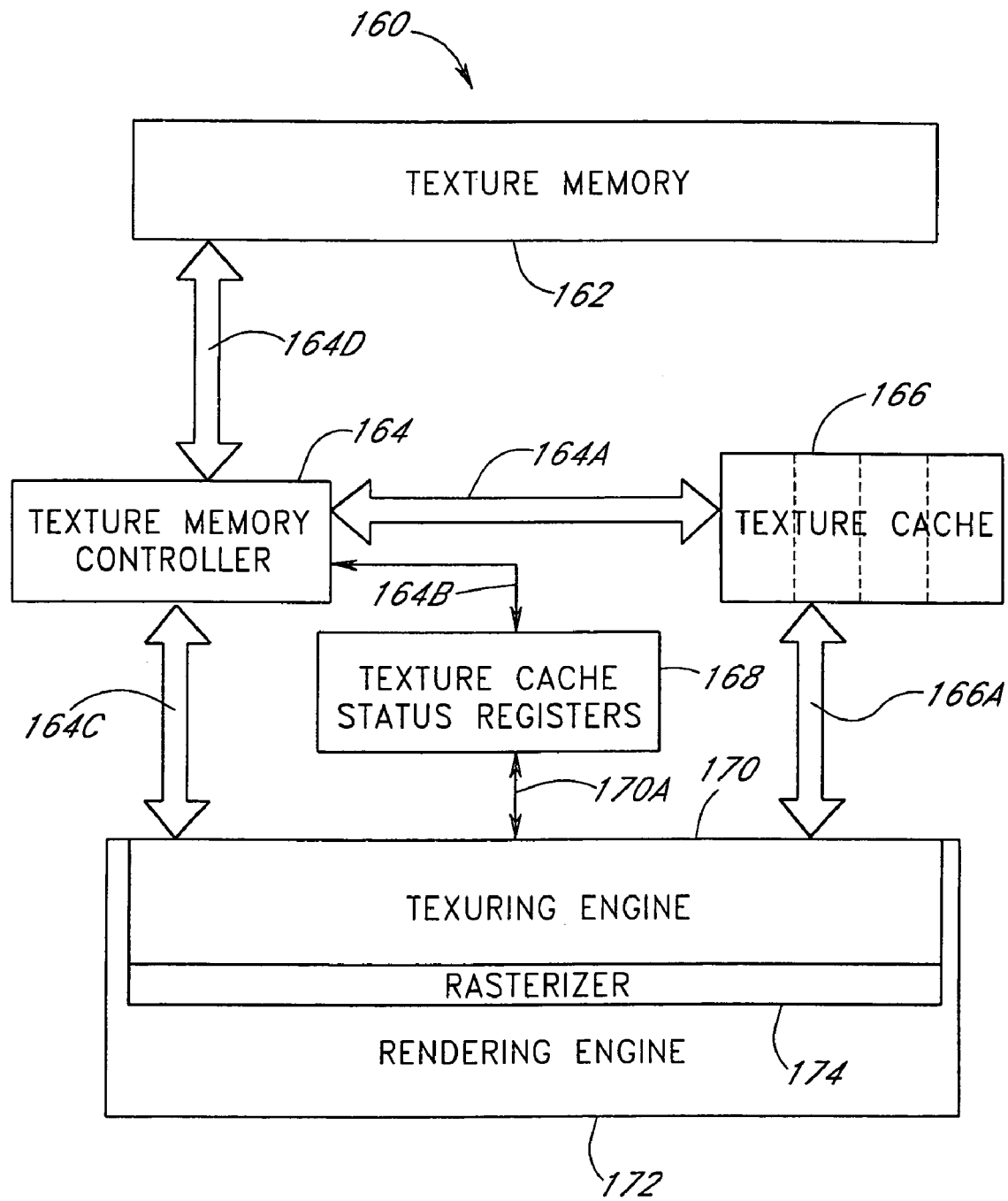
FIG. 2 illustrates one embodiment of a texturing system in accordance with the present invention.

FIG. 1B illustrates a second eye point 120 above a plurality of texture layers 102, 104, 106, 108. Similarly, in FIG. 1B, the illusion of depth at the second eye point position 120 is achieved through blending modes that are used to combine texels 124, 126, 128, 130 chosen from each texture layer 102, 104, 106, 108 and from the parallax between the different layers 102, 104, 106, 108. FIGS. 1 and 2 illustrate how changing the eye point angle for a given texel, such as texel 110 or 125, in the first texel layer 102 changes the selected texels in lower texel layers.

The texture layers 102, 104, 106, 108 of FIGS. 1A and 1B may represent opaque surfaces that have layered partial transparency, such as Opal, Aragonite, Pectolite and other minerals and gemstones. Some types of plastic and thickly-layered metal flake paint also exhibit this semi-opaque surface quality. Other layered materials include biological tissues (e.g., skin, leaves, etc.) or inorganic materials (e.g., snow, sand, paint, varnished or dusty surfaces).

When rendering a texture that has an apparent depth component, each texel in each texture layer, such as the first texture layer 102 in FIG. 1A, has two parts: a color component and an alpha value ($\alpha$). In conventional systems, the alpha value is a blending value associated with a red-green-blue (RGB) triplet. In the texturing system 160 of FIG. 2, the alpha value may be specified per color component (red, green and blue). For example, there may be a first alpha value for red, a second alpha value for green, and a third alpha value for blue. The alpha values may allow the color of one texel in one texture layer to tint the colors of a texel in a layer above or below the first layer. For example, the alpha values may span a range to allow a color in a layer to span a spectrum from fully opaque to fully clear.

FIG. 2 illustrates one embodiment of a texturing system 160 in accordance with the present invention. The texturing system 160 comprises a texture memory 162, a texture memory controller 164, a texture cache 166, a set of texture cache status registers 168, a texturing engine 170, a rasterizer 174, and a rendering engine 172.

Various types of memories, caches, controllers, registers and/or processing components may be used in accordance with the present invention. The scope of the present invention is not limited to a particular type of memory, cache, controller, register and/or processing component. Various embodiments of the system 160 may comprise other components in addition to or instead of the components shown in FIG. 2 without departing from the scope of the invention. For example, the system 160 may comprise additional memories, caches, controllers, registers and/or processing components. The components shown in FIG. 2 may be implemented by software, hardware or a combination of software and hardware.

In FIG. 2, the texture memory 160 may comprise, for example, an EEPROM, DRAM, SDRAM, flash memory or other suitable storage unit. Similarly, the texture cache 166 may comprise, for example, an EEPROM, DRAM, SDRAM, flash memory or other suitable storage unit. The texture memory controller 164 may comprise a microcontroller. The texture status registers 168 may comprise an array of registers. The texturing engine 170, rasterizer 174 and rendering engine 172 may comprise a microcontroller with firmware and may be separate or integrated components.

The components in FIG. 2 are coupled to each other by a plurality of lines 164A, 164B, 164C, 164D, 166A, 170A.

Each line 164A, 164B, 164C, 164D, 166A, 170A may comprise a single line, a plurality of lines, a bus, a combination of single lines and buses, or some other suitable type of address and/or data transfer means.

Texture Memory Format

Figure 3:
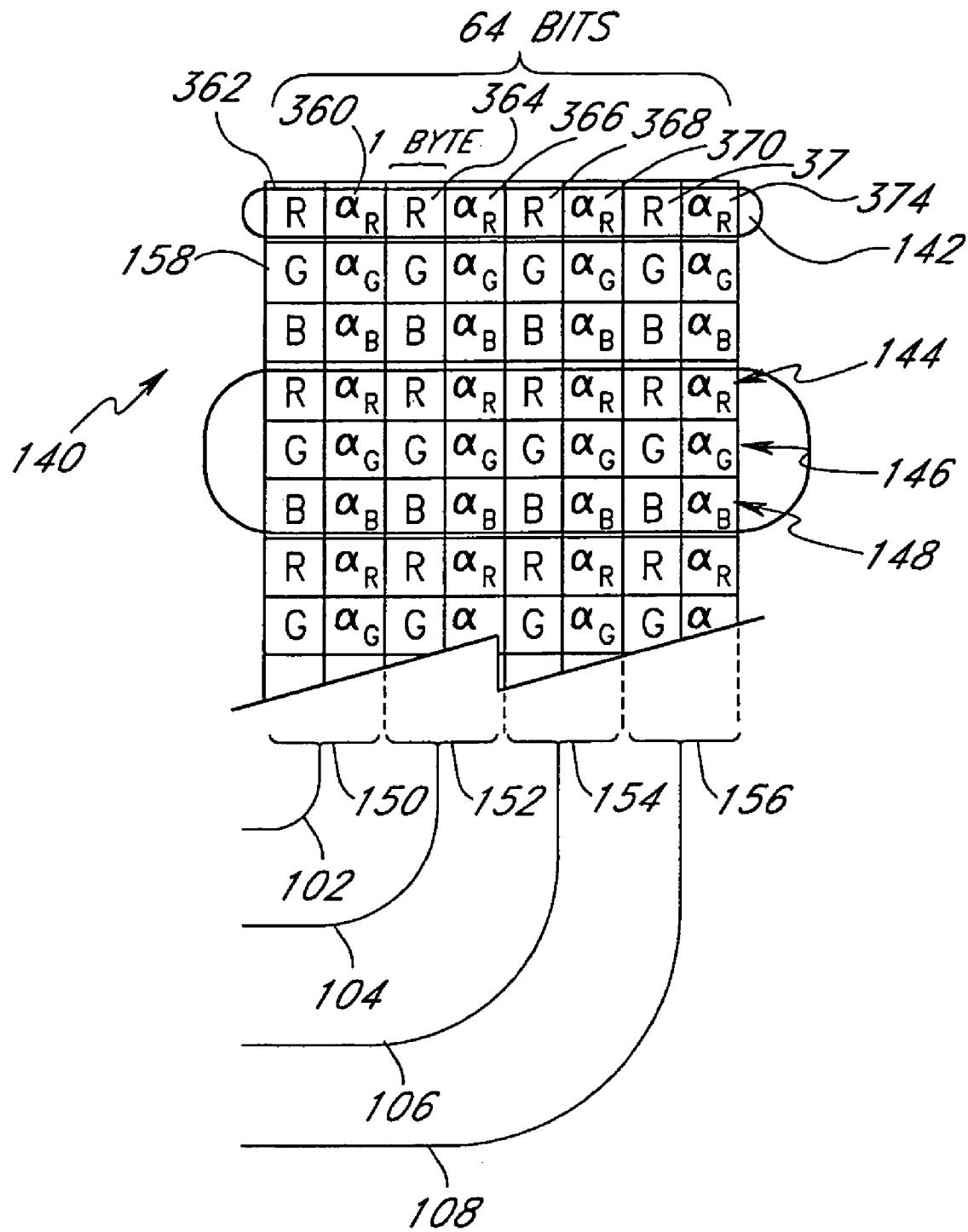
FIG. 3 illustrates one embodiment of a texture memory format that may be used by the texturing system of FIG. 2.

FIG. 3 illustrates one embodiment of a texture memory format 140 that may be used by the texture memory 162 of FIG. 2. The texture memory format 140 may represent a texture map set that comprises two or more texture layers. The memory format 140 comprises a plurality of rows and columns. Each row of the memory format 140 represents a memory word, such as the first memory word 142 shown in FIG. 3. Each memory word comprises 64 bits or eight bytes, where each byte comprises eight bits. Each byte stores color data values, such as red (R), blue (B) or green (G), or α values. In other embodiments, each memory word may be 16, 32, 48 or 80 bits wide or some other suitable width.

In FIG. 3, each memory word, such as the first memory word 142, comprises color values from the first, second, third and fourth texture layers 102, 104, 106, 108 of FIGS. 1A–1B. Specifically, color values of the first texture layer 102 of FIG. 1A are stored in the first pair of columns 150 of the memory format 140. Color values of the second texture layer 104 of FIG. 1A are stored in the second pair of columns 152 of the memory format 140. Color values of the third texture layer 106 of FIG. 1A are stored in the third pair of columns 154 of the memory format 140. Color values of the fourth texture layer 108 of FIG. 1A are stored in the fourth pair of columns 156 of the memory format 140. Each texel, such as the first texel 158 in the first texture layer 102, comprises an R data value, an R alpha component, a G data value, a G alpha value, a B data value and a B alpha value.

As used herein, a 'texture packet' or 'packet' may refer to a color component packet or a texel packet. A color component packet comprises color values associated with one color, such as red, wherein the color values are from two or more texture layers. A color component packet may or may not comprise alpha values. One example of a color component packet comprises the first memory word 142 in FIG. 3. Another example of a color component packet comprises the first four bytes 362, 360, 364, 366 in FIG. 3. Another example of a color component packet comprises the first word 324 of texture memory format 320 in FIG. 7A. Another example of a color component packet comprises the first and second bytes 350, 400 in FIG. 7A.

A texel packet comprises one or more texels, wherein in a texel comprises a red color value byte, a green color value byte and a blue color value byte. A texel packet may or may not comprise alpha values. One example of a texel packet comprises the first texel 158 in FIG. 3. Another example of a texel packet comprises the four texels in the three memory words 144, 146, 148 shown in FIG. 3. Another example of a texel packet comprises the RGB triplet 328 in FIG. 7A. Another example of a texel packet comprises the packet 322 in FIG. 7A.

Figure 4A:
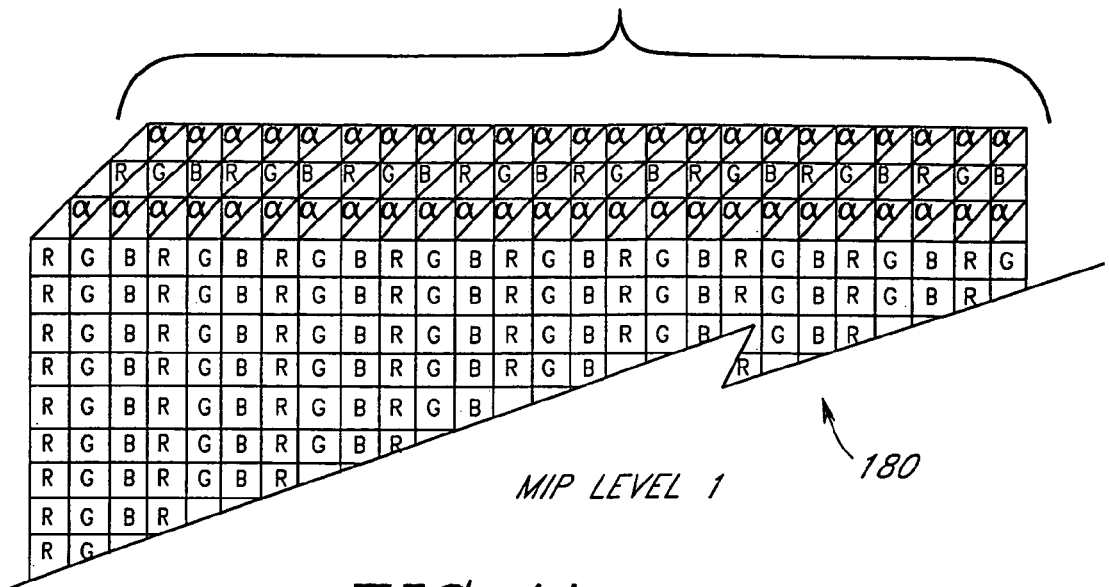
FIGS. 4A–4D illustrate one embodiment of a texture-packing format applied to multiple MIP levels that may be used by the texturing system of FIG. 2.
Figure 4B:
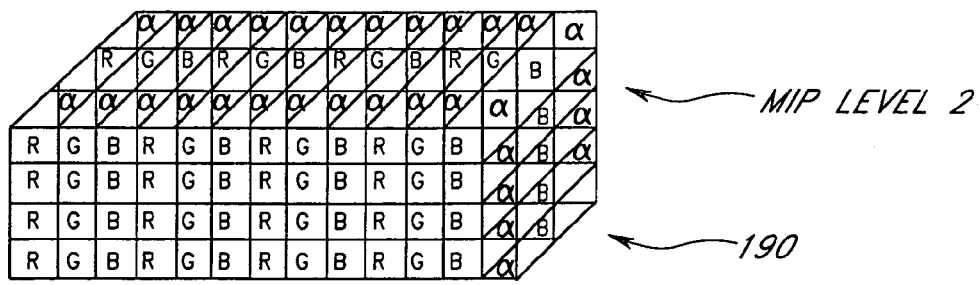
Figure 4C:
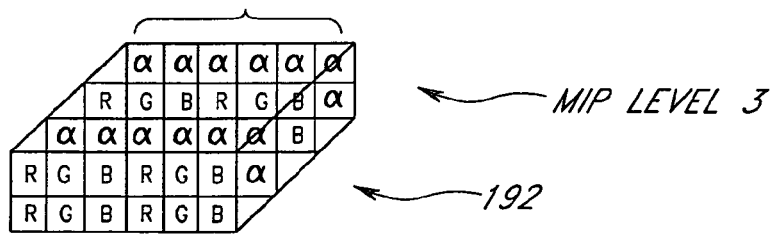
Figure 4D:
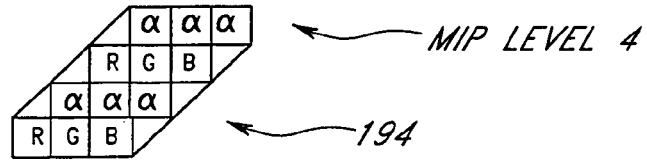

FIGS. 4A–4D illustrate one embodiment of a texture-packing format applied to multiple MIP levels that may be used by the texturing system 160 of FIG. 2. In FIG. 4A, a first level MIP map 180 is eight texels high and eight texels wide and comprises a first layer 182 and a second layer 184. In FIG. 4B, a second level MIP map 190 is four texels high and four texels wide. In FIG. 4C, a third level MIP map 192 is two texels high and two texels wide. In FIG. 4D, a fourth level MIP map 194 is one texel high and one texel wide. In one embodiment, the color component packing format of FIG. 3 applies to all of the MIP maps of the stored texture, as shown in FIGS. 4A–4D. The size of a fragment to be textured determines which MIP map in FIGS. 4A–4D is used by the texturing engine 170.

In one embodiment, all of the images used in a layered texture are matched to have the same width and height before being stored as texture MIP map data.

In general, the texture memory controller 164 of FIG. 2 receives new textures sent by a host computer (not shown) with pre-set attributes for each texture. The texture memory controller 164 stores the new textures in the texture memory 162 via line 164D. The textures may be stored as texture map sets, where each texture map set comprises two or more texture layers. The pre-set attributes include at least a width, a height, a texel format and a texel packing factor. The texel format indicates (i) the number of bits per texel, (ii) a texel operation mode (e.g., true color or color look-up table (CLUT)), and (iii) a texture mode flag to indicate whether depth texturing is to be used or not.

The texel packing factor can be used to layer several textures together for either (1) depth texturing or for (2) combining several textures in a single rendering pass. The difference between (1) and (2) is the depth stepping offset between texture layers in the latter case is set to zero. The texture mode flag controls whether a depth stepping offset between textures will be used or not.

The texture memory controller 164 of FIG. 2 packs color and alpha data values from several texture layers 102, 104, 106, 108 (FIG. 1A) together into each memory word, which is stored in the memory format 140 of FIG. 3 or FIGS. 7A–7C. For example, four texels from four different texture layers 102, 104, 106, 108 (FIG. 1A) are packed into three memory words 144, 146, 148 in FIG. 3. The packing arrangement of FIGS. 3 and 4A–4D allows the texture memory controller 164 to access the packed color and alpha data values (texture data) from several texture layers as a discrete packet. Examples of color component packets and texel packets are described above.

The texture memory controller 164 may then pass one or more packets via line 164A to the texture cache 166 and/or the texturing engine 170 via line 164C. The packing arrangements of FIGS. 3, 4A–4D and 7A–7C advantageously improve the speed and efficiency of the texture memory controller 164 and the texturing engine 170.

The texture cache 166 stores packets that have been recently accessed by the texture memory controller 164. The texture cache 166 may store texels from multiple textures for a scene, such as textures for a ceiling, a floor and a throne, of a throne room in a game. The texture cache 166 passes the packets to the texturing engine 170 via line 166A, as described below.

The texture cache status registers 168 receive and store information, such as the texture attributes described above, from the texture memory controller 164 via line 164B. The information from the texture memory controller 164 may indicate which texture is in each cache page, the texture mode and the packing scheme, e.g., the color component packing format used for each texture packet/set.

In operation, the texturing engine 170 sends a texture packet request to the texture memory controller 164 via line 164C and/or the texture cache 166 via line 166A. As used herein, a "texture packet request" may comprise (1) a request for one or more RGB texels, including one or more R alpha values, G alpha values and B alpha values, from the same texture layer; (2) a request for one or more RGB texels, including one or more R alpha values, G alpha values and B alpha values, from two or more different texture layers; or (3) a request for a one or more memory words, such as the first memory word 142 shown in FIG. 3.

The texture memory controller 164 or the texturing engine 170 accesses the texture cache status registers 168 via lines 164B or 170A to determine whether some or all of the requested texture packets are in the texture cache 166. If some or all of the requested texture packets are in the texture cache 166, then the texture memory controller 164 or the texturing engine 170 commands the texture cache 166 to pass the requested texture packets in the texture cache 166 to the texturing engine 170 via line 166A for processing.

For example, the texturing engine 170 may request texture packets that have been used in a previous rendering process, such as for example, in a multi-texturing or semi-opaque surface rendering process. The texture cache 166 provides the requested texture packets to the texturing engine 170 faster than the texture memory controller 164 retrieving the requested texture packets from the texture memory 162.

If the texture cache 166 does not have all of the requested texture packets, then the texture memory controller 164 retrieves the requested texture packets from the texture memory 162 via line 164D. Various methods of retrieval may be used, such as for example, retrieval by one or more texels or by one or more memory words, as described above with reference to FIGS. 3 and 7A–7C. The texture memory controller 164 passes the requested texture packets to the texture cache 166 via line 164B. The texture cache 166 caches the requested texture packets and passes the requested texture packets to the texturing engine 170 via line 166A.

In one embodiment, the texture memory controller 164 sends an interrupt signal to the texturing engine 170 via line 164C to indicate when requested texture packets are in the texture cache 166 and ready for retrieval. The texturing engine 170 may then send a texture packet request to the texture cache 166 via line 166A to command the texel cache 166 to begin passing the requested texture packets to the texturing engine 170.

When the texture memory controller 164 retrieves requested texture packets from the texture memory 162 via line 164D, the texture memory controller 164 also retrieves information about the texture packets, such as the attributes described above, and passes the information to the texture cache status registers 168 via line 164B. For example, the information in the texture cache status registers 168 may indicate which texture is in each cache page, including the texture mode and the packing scheme. The information in the texture cache status registers 168 may be accessed by the texture memory controller 164 via line 164B or the texturing engine 170 via line 170A.

Figure 7A:
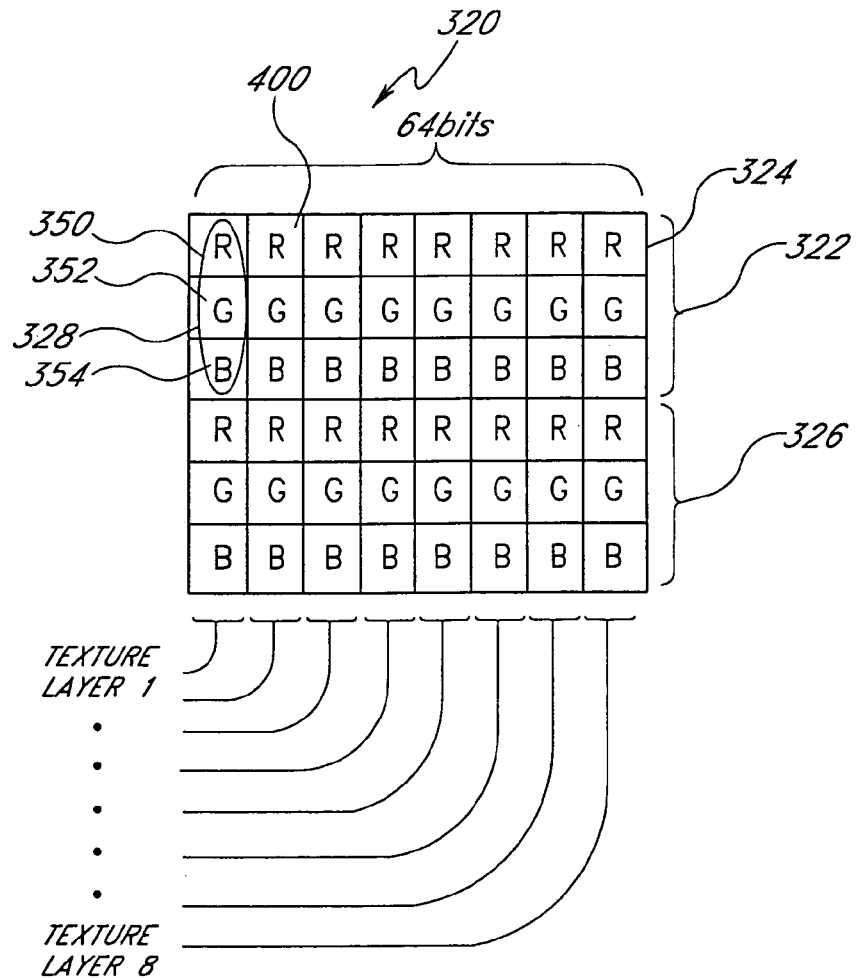
FIG. 7A illustrates another embodiment of a texture memory format that may be used by the texturing system of FIG. 2.

FIG. 7A illustrates another embodiment of a texture memory format 320 that may be used by the texturing system 160 of FIG. 2. The format 320 of FIG. 7A allows eight texture layers to be stored and accessed together. Each memory word, such as the first word 324, comprises eight color values, where each color value is from a different texture layer. A packet, such as the packets 322, 326, of three memory words contains eight RGB triplets from eight different texture layers. Thus, the format 320 allows the texture memory controller 164 to access texels from twice as many texture layers at one time as the format 140 in FIG. 3.

Figures 7B, 7C:
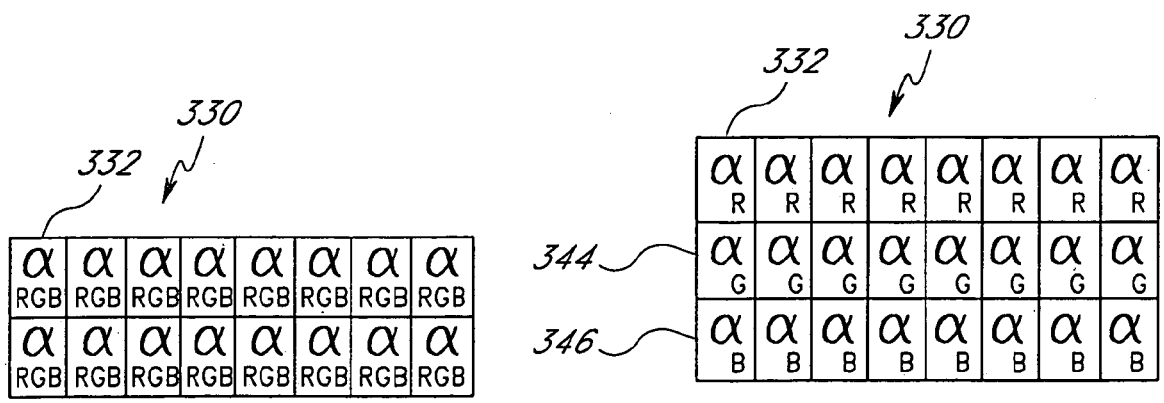
FIGS. 7B–7C illustrate two embodiments of alpha maps that may be used by the texturing system of FIG. 2.

FIGS. 7B–7C illustrate two embodiments of alpha maps 330, 340 that may be used in conjunction with the memory format 320 of FIG. 7A by the texturing system 160 of FIG. 2. In FIG. 7B, each alpha value is associated with a RGB triplet in FIG. 7A. For example, a first alpha value 332 represents the amount of blending or mixing for a first RGB triplet 328 in FIG. 7A. In FIG. 7C, each alpha value is associated with a color value component in FIG. 7A. For example, a first alpha value 342 in FIG. 7C is associated with a first color value 350 in FIG. 7A, a second alpha value 344 is associated with a second color value 352, and a third alpha value 346 is associated with a third color value 354.

Rendering Semi-Opaque Surfaces by Creating Apparent Surface Depth

In a preferred embodiment, the texturing engine 170 applies textures to a semi-opaque surface one fragment at a time. The texturing of semi-opaque surfaces described herein may be implemented with the memory formats shown in FIGS. 3, 4A–4D and 7A–7C or other suitable memory configurations known to those skilled in the art.

Figure 5A:
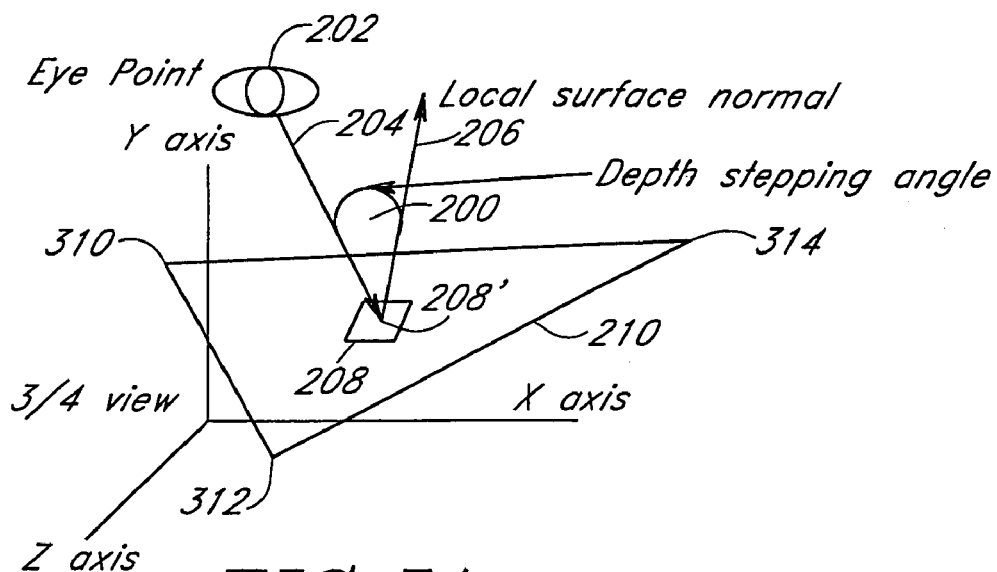
FIGS. 5A–5C illustrate a depth stepping angle and its components.

The texturing engine 170 of FIG. 2 applies a unique offset between the texture layers to each polygon fragment, such as the polygon fragment 208 shown in FIG. 5A. The offset is derived by interpolating two values associated with each vertex of the polygon fragment. These two values comprise a depth stepping angle 212 in the x direction (FIG. 5B) and a depth stepping angle 230 in the y direction (FIG. 5C) at each vertex of the polygon fragment.

Figure 5B:
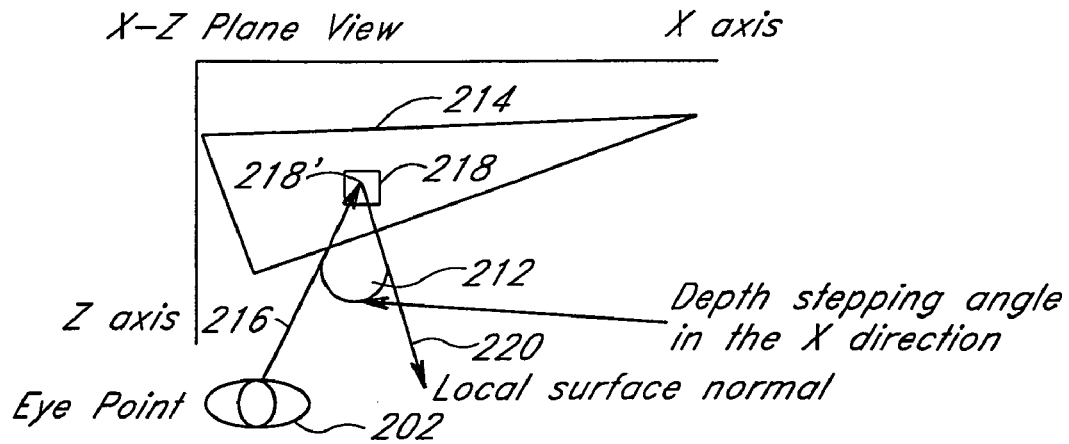
Figure 5C:
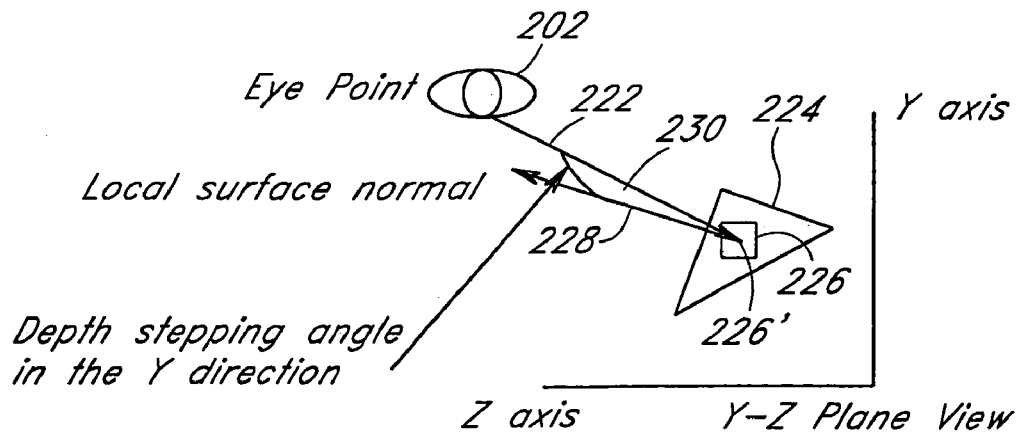

FIGS. 5A–5C illustrate a depth stepping angle 200 and its components 212, 230. FIG. 5A further illustrates a fragment 208 on a polygon surface 210 in an (x, y, z) viewing plane, where the texturing engine 170 of FIG. 2 will map texture(s) from the texture memory 160 and/or the texture cache 166 to the fragment 208.

In FIG. 5A, the depth stepping angle 200 is the angle between (i) a vector 204 from an eye point 202 to a fragment center 208' on a surface (or polygon) 210 that is being rendered, and (ii) a local surface normal vector 206 at the fragment 208 on the polygon 210 where the texel data is to be mapped. In one embodiment, the stepping angle 200 is expressed in radians as having an X-component 212 and a Y-component 230 as shown in FIGS. 5B and 5C. In one embodiment, the texturing engine 170 interpolates the eye point vector 204 for the fragment 208 from eye point vectors associated with vertices 310, 312, 314 of the polygon 210. Likewise, the texturing engine 170 may interpolate the normal vector 206 for the fragment 208 from the vectors associated with vertices 310, 312, 314 of the polygon 210.

FIG. 5B illustrates the X-component 212 of the depth-stepping angle which comprises an angle between (i) a vector 216 from an eye point 202 to a fragment center 218' on a surface 214 in the X-Z plane, and (ii) a local surface normal vector 220 at the fragment 218 on the polygon 214 in the X-Z plane.

FIG. 5C illustrates the Y-component 230 of the depth-stepping angle which comprises an angle between (i) a vector 222 from an eye point 202 to a fragment center 226' on a surface 224 in the Y-Z plane, and (ii) a local surface normal vector 228 at the fragment 226 on the polygon 224 in the Y-Z plane.

The X and Y components 212, 230 of the depth stepping angle 200 represent X and Y depth stepping values in radians that range from 0.0 to $\pi/2$ (i.e., from 0.0 to 1.5707963 . . . ). In one embodiment, the system 160 uses floating point numbers, which are expressed in fixed-point representation/notation. To render a fragment with multiple texture layers, the texturing engine 170 converts the X and Y depth stepping values to X and Y texel offset values. In one embodiment, the X and Y texel offset values simply equal the X and Y depth stepping values. The texturing engine 170 uses the X and Y texel offset values to determine which texels from each lower texture layer are used to render a particular fragment.

For example, the texturing engine 170 applies the X and Y offset values to a selected texel(s) in a top texture layer, such as the first texel 110 in the first texture layer 102 in FIG. 1A, to find a corresponding texel(s) in a second layer, such as the second texel 112 in the second texture layer 104 in FIG. 1A. The texturing engine 170 then applies the offset values to the texel(s) chosen from the second layer to find a texel(s) in a third layer, such as the third texel 114 in the third texture layer 106 in FIG. 1A. The texturing engine 170 then applies the offset values to the texel(s) in the third layer to find a texel(s) in a fourth layer, such as the fourth texel 116 in the fourth texture layer 108 in FIG. 1A. These steps may be repeated thereafter if there are more than four texture layers. The texturing engine 170 may use less than four texture layers or more than four texture layers.

The offset values may be positive or negative, depending on whether the texturing engine 170 selects texels toward or away from the eye point on lower texture layers.

The amount of parallax or displacement between texels in different texture layers determines the amount of distortion of multiple textures applied to a fragment. Exemplifying distortions include distortion by glass, plastic materials, fog, semi-opaque materials, etc. The texturing engine 170 may adjust the amount of parallax based on the desired features of a particular image. If there is no parallax, then the textures are applied to the fragment as conventional multi-texturing with no apparent surface depth.

In one embodiment, the texturing engine 170 uses a left bit shift to control the amount of parallax displacement between texels in different texture layers. A left bit shift means binary bits representing a texel offset value are shifted to the left by one. In one embodiment, when a fragment projected (mapped) on a texture map is shifted, the projected fragment is shifted according to the coordinates of the polygon in the viewing plane, not according to the coordinates of the texture map. Thus, the shift of a projected fragment on a texture map depends on the orientation of the projected fragment onto the texture map.

The bit shift controls the maximum texel displacement when the angle (e.g., angle 212) between the surface normal (e.g., normal 220) and the eye point vector (e.g., vector 216) reaches 90 degrees. With a bit shift of zero (no shifting), the maximum shift between layers is approximately 1.5707963 texels. With a bit shift factor of one, the maximum shift between layers becomes approximately 3.141529 texels. As the bit shift factor increases, the maximum shift between multiple texture layers increases.

Changing the shift factor allows for control of the amount of parallax between texture layers, such as the texture layers 102, 104, 106, 108 of FIG. 1A. As an object is moved or rotated, the parallax between these layers will give the illusion of depth to the surface.

The texturing engine 170 may use another adjustment to scale the texel offset values to a particular MIP level used for texturing. As described above, the texturing engine 170 selects a MIP map based on the size of the projected fragment into texture space. For the first MIP level, there is no adjustment to the texel offset values. For the second MIP level, the adjustment may be accomplished by right-shifting the texel offset values by one. For the third MIP level, the adjustment may be accomplished by right-shifting the texel offset values by two. For the fourth MIP level, the adjustment may be accomplished by right-shifting the texel offset values by three.

As the texturing engine 170 renders a series of fragments/pixels, the Y-depth and X-depth stepping angles 230, 212 change. Assuming that the polygon surface 210 of FIG. 5A is planar, the texturing engine 170 may use signed incremental addition to increment the Y-depth stepping angle 230 for each new span (contiguous group of pixels of a polygon) and to set the starting X-depth stepping angle 212 at the beginning of each span. While the texturing engine 170 renders a span, the X-depth stepping angle 212 is incremented for each fragment 208. This process is comparable to interpolating surface normal values across the face of a polygon 210. The difference is, here the texturing engine 170 is interpolating the angle 200 between the eye point 202 and the surface normal 206 for the fragment 208 being rendered.

When constructing a depth texture, the alpha components in a particular texture layer may determine how much of the texture layers below the particular layer shows through. The color components in each texture layer are blended to create the surface and sub-surface details that create the "look" of a texture at a fragment. For example, in FIG. 3, the first red alpha value 360 determines whether the first red value 362 is opaque or transparent or somewhere in between. Thus, the first alpha value 360 can be said to control the blending between the first and second red color values 362, 364.

The alpha values for the lowest texture layer 156 control the blending of the depth texture(s) with an interpolated polygon color at the location of the fragment being textured. The depth texture(s) may comprise either (1) a combined color texture of the first, second and third color values 362, 364, 368, 372 and their alpha values 360, 366, 370 or (2) the color value 372 of the last texture layer 156. The polygon color at a fragment location is interpolated from the color values associated with each vertex of the polygon and the location of the fragment within the polygon. The alpha values of the last texture layer 156 may be used to render the effect of lighting in an image.

For example, a displayed character in a game may have a green-tinted face because the character is poisoned. In one embodiment, texturing engine 170 may achieve the green-tinted face by adjusting the red and blue alpha values of the top texture layer(s) 102, 104 (FIG. 3), such that the red and blue colors appear more transparent. The texturing engine 170 preferably does not adjust the red and blue color components in the texture layers, only the red and blue alpha values. The green color thus becomes more dominant on the character's face. When the character is not poisoned anymore, the texturing engine 170 may copy the green alpha value to replace the adjusted red and blue alpha values or use some other method to adjust the red and blue alpha values to their normal values.

Since the texturing engine 170 is modeling a thin shell of semi-opaque layers, the apparent distance between each texture layer is very small, and a simple linear relationship between layers may be used.

When the texturing engine 170 is not in depth texturing mode, no offset between the texture layers is applied, and the color components from the same texel location in each layer are blended according to the alpha components associated with each layer. When rendering multiple textures without a depth component, each texture has two parts: a color component and an alpha value. The alpha value may be used to control the blending between the individual textures on a per color component basis, as with depth texturing. The difference is that there is no offset between the texture layers, and hence no parallax.

Both depth texturing and multi-texturing, or various combinations, may be combined together in two or more texturing passes by the texturing engine 170 by storing the intermediate results. In each texture pass, the number of layered textures may vary.

Figure 6A:
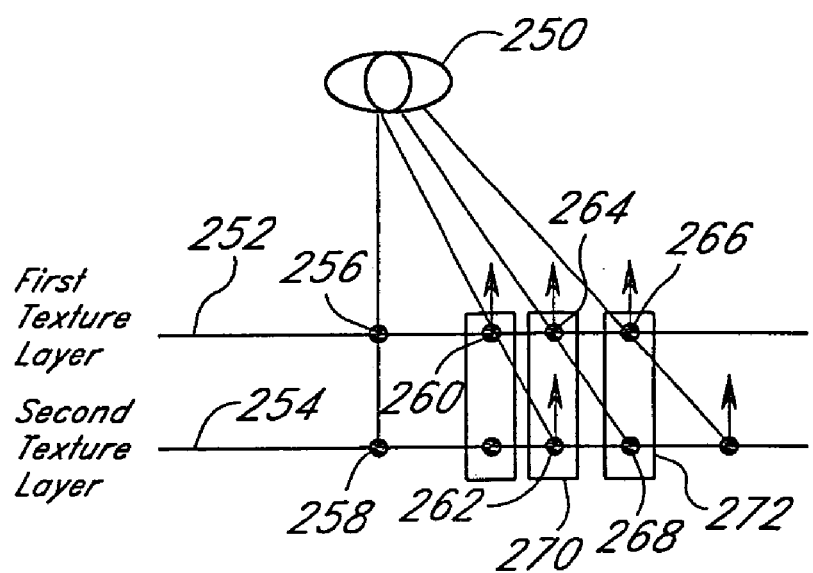
FIGS. 6A–6B illustrate one embodiment of a method of processing texels on multiple texture layers.
Figure 6B:
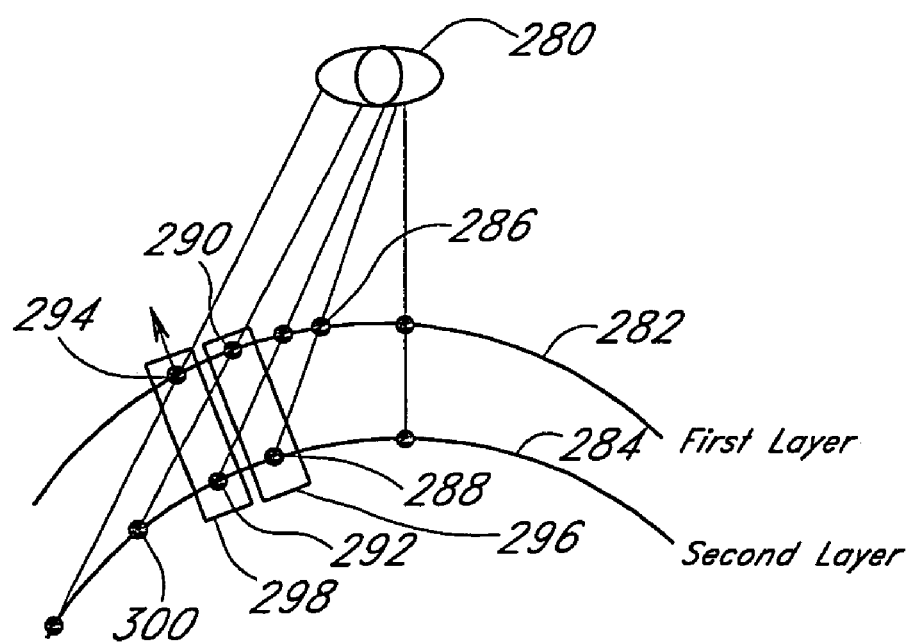

FIGS. 6A–6B illustrate one embodiment of a method of processing texels in multiple texture layers. FIG. 6A illustrates an eye point 250, a first texture layer 252 and a second texture layer 254. As described above, the texture memory controller 164 of FIG. 2 uses the memory format of FIGS. 3 and 4A–4D and caches texels from multiple texture layers. For example, the packet of three memory words 144, 146, 148 in FIG. 3 comprises four texels from four different texture layers 150, 152, 154, 156.

In FIG. 6A, the second texel 262 and a third texel 264 are in the same texel packet 270. The texture memory controller 164 accesses and caches the second and third texels 262, 264 together. When the texturing engine 170 of FIG. 2 processes a first texel 260 in the first texel layer 252 and the second texel 262 in the second texel layer 254, the texture cache 166 caches the first, second and third texels 260, 262, 264. When the texturing engine 170 processes the third texel 264 and a fourth texel 268, the third texel value is already stored in the texture cache 166. Thus, the texturing system 160 takes advantage of spatial congruence and the packing formats of FIGS. 3 and 4A–4D to reduce the time to access texels stored in the texture memory 162. The packing formats of FIGS. 3 and 4A–4D improves texture cache efficiency.

FIG. 6B illustrates an eye point 280, a first texture layer 282 and a second texture layer 284. Likewise, a first texel 290 and a second texel 288 are in the same texel packet 296. The texture memory controller 164 accesses and caches the first and second texels 290, 288 together. When the texturing engine 170 of FIG. 2 processes the second texel 288 in the second texel layer 284 and a third texel 286 in the first texel layer 282, the texture cache 166 caches the first, second and third texels 290, 288, 286. When the texturing engine 170 processes the first texel 290 and a fourth texel 300, the first texel value is already stored in the texture cache 166.

The above-described embodiments of the present invention are merely meant to be illustrative and not limiting. It will thus be obvious to those skilled in the art that various changes and modifications may be made without departing from this invention in its broader aspects. The appended claims encompass all such changes and modifications as fall within the true spirit and scope of this invention.

What is claimed is:

1. A system for managing texture data, the system comprising:
    a texture memory controller coupled to a texturing engine; and
    a texture memory coupled to the texture memory controller, the texture memory configured to store texture data in a texture map set, the texture map set comprising two or more texture layers, wherein the texture memory controller is configured to access one or more packets from the texture memory and pass the packets to the texturing engine, each packet comprising texture data from at least two texture layers,
        wherein the texturing engine applies a unique texel offset between the at least two texture layers, such that texels from different texel locations in each of said at least two texture layers are blended.

2. The system of claim 1, wherein a packet comprises color values associated with one color, the color values being from two or more texture layers.

3. The system of claim 2, wherein the packet further comprises alpha values representing the amount of blending of the color values.

4. The system of claim 1, wherein a packet comprises:
    a first red-green-blue texel from a first texture layer; and
    a second red-green-blue texel from a second texture layer.

5. The system of claim 4, wherein the packet further comprises:
    a first alpha value associated with the first red-green-blue texel from the first texture layer; and
    a second alpha value associated with the second red-green-blue texel from the second texture layer.

6. The system of claim 4, wherein the packet further comprises:
    a first red alpha value, a first green alpha value and a first blue alpha value associated with the first red-green-blue texel from the first texture layer; and
    a second red alpha value, a second green alpha value and a second blue alpha value associated with the second red-green-blue texel from the second texture layer.

7. The system of claim 6, wherein the texturing engine is configured to modify the alpha values for one or more colors without modifying the alpha values for other colors.

8. The system of claim 1, further comprising a texture cache coupled to the texture memory controller and the texturing engine, the texture cache configured to store packets that have been recently retrieved from the texture memory, the texture cache configured to send recently-retrieved packets to the texturing engine.

9. The system of claim 8, further comprising a set of texture cache status registers coupled to the texture memory controller and the texture engine, the texture cache status registers configured to store at least one texture attribute associated with the packets stored in the texture cache.

10. The system of claim 1, wherein the texture memory is configured to store attributes associated with each texture layer, the attributes comprising:
    a width of a texture layer;
    a height of a texture layer;
    a texel format; and
    a texel packing factor.

11. The system of claim 10, wherein the texel format indicates the number of bits per texel, a texel operation mode, and a texture mode flag to indicate whether depth texturing is to be used or not.

12. The system of claim 10, wherein the texel packing factor is used by the texturing engine to layer several textures together for depth texturing.

13. The system of claim 10, wherein the texel packing factor is used by the texturing engine to layer several textures together for combining several textures in a single rendering pass.

14. The system of claim 1, wherein the texture memory further comprises an alpha map, the alpha map comprising alpha values, each alpha value represents the amount of blending for a red-green-blue triplet within the texture memory.

15. The system of claim 1, wherein the texture memory further comprises an alpha map, the alpha map comprising alpha values, each alpha value represents the amount of blending of one color value in a texture layer within the texture memory.

16. A method of managing texture data, the method comprising the steps of:
    storing a texture map set in a texture memory, the texture map set comprising two or more layers; and
    retrieving one or more packets from the texture memory, each packet comprising texture data from at least two texture layers, wherein a unique texel offset is applied between the at least two texture layers, such that texels from different texel locations in each of said at least two texture layers are blended.

17. The method of claim 16, further comprising:
receiving a request for one or more packets;
accessing a set of texture cache status registers to determine whether some or all of the requested packets are stored in a texture cache;
passing requested packets stored in the texture cache to a texturing engine if some or all of the requested packets are stored in the texture cache; and
retrieving requested packets from the texture memory if the texture cache does not have all of the requested packets.

18. The method of claim 16, further comprising retrieving information associated with each texture layer, the information comprising:
a width of a texture layer;
a height of a texture layer;
a texel format; and
a texel packaging factor.

19. The method of claim 18, further comprising storing the information associated with each texture layer in a set of texture cache status registers.

20. The method of claim 16, wherein a packet comprises color values associated with one color, the color values being from two or more texture layers.

21. The method of claim 20, wherein the packet further comprises alpha values representing the amount of blending of the color values.

22. The method of claim 16, wherein a packet comprises:
a first red-green-blue texel from a first texture layer; and
a second red-green-blue texel from a second texture layer.

23. The system of claim 22, wherein the packet further comprises:
a first alpha value associated with the first red-green-blue texel from the first texture layer; and
a second alpha value associated with the second red-green-blue texel from the second texture layer.

24. The system of claim 22, wherein the packet further comprises:
a first red alpha value, a first green alpha value and a first blue alpha value associated with the first red-green-blue texel from the first texture layer; and
a second red alpha value, a second green alpha value and a second blue alpha value associated with the second red-green-blue texel from the second texture layer.

25. The method of claim 24, further comprising modifying the alpha values for one or more colors without modifying the alpha values for other colors.

26. A method of surface depth texturing, the method comprising:
determining a depth stepping angle, the depth stepping angle formed by a first vector from an eye point position to a fragment in a polygon surface and a second vector normal to the surface of the fragment;
converting the depth stepping angle to one or more texel offset values;
applying the texel offset values to a first texel in a first texture layer to find a corresponding second texel in a second texture layer;
blending one or more color values and one or more alpha values associated with the first and second texels to create an apparent surface depth for the fragment; and
applying the blended color values and alpha values to the fragment.

27. The method of claim 26, wherein converting the depth stepping angle to one or more texel offset values comprises adjusting an amount of parallax between the first and second texture layers.

28. The method of claim 27, wherein adjusting an amount of parallax comprises left-shifting a set of binary bits representing the texel offset values.

29. The method of claim 26, further comprising right-shilling a set or binary bits representing the texel offset values by one bit for a selected second level MIP map, by two bits for a selected third level MIP map, by three bits for a selected fourth level MIP map.

30. The method of claim 26, wherein the texel offset values are positive.

31. The method of claim 26, wherein the texel offset values are negative.

32. The method of claim 26, wherein the color values comprise red, green, and blue.

33. The method of claim 26, wherein the alpha values comprise a red alpha value, a green alpha value and a blue alpha value.

34. The method of claim 33, further comprising modifying the alpha values for one or more colors without modifying the alpha values for other colors.

35. The method of claim 26, wherein the alpha values from the second texel control blending of the first and second texel color values with an interpolated polygon color at a location of the fragment.

36. The method of claim 26, wherein the acts are repeated for a second fragment with a second depth stepping angle.

37. The method of claim 26, further comprising:
caching the second texel and a third texel; and
accessing a fourth texel from a texture memory and the third texel from a texture cache when the acts are repeated for a second fragment with a second depth stepping angle.

38. The method of claim 26, wherein the acts are performed in real-time.

39. A surface-depth texturing system comprising:
a texturing engine; and
a texturing memory coupled to the texturing engine, wherein the texturing engine is configured to retrieve a first texel in a first texture layer from the texture memory; determine a depth stepping angle between a first vector from an eye point position to a fragment in a polygon surface and a second vector normal to the surface of the fragment; convert the depth stepping angle to one or more texel offset values; apply the texel offset values to the first texel to find a corresponding second texel in a second texture layer; blend one or more color values and one or more alpha values associated with the first and second texels to create an apparent surface depth for the fragment; and apply the blended color values and alpha values to the fragment.

40. The texturing system of claim 39, wherein each texel comprises a red color value, a red alpha value, a green color value, a green alpha value, a blue color value and a blue alpha value.

* * * * *

UNITED STATES PATENT AND TRADEMARK OFFICE
CERTIFICATE OF CORRECTION

PATENT NO. : 7,136,069 B1 Page 1 of 1
APPLICATION NO. : 09/703020
DATED : November 14, 2006
INVENTOR(S) : Thomas Patrick Dawson It is certified that error appears in the above-identified patent and that said Letters Patent is hereby corrected as shown below:

Specification, Col. 1, Line 23, after "stripes", change "check.erboards," to -- checkerboards, --.

Specification, Col. 6, Line 23, after "layers", change "in" to -- if --.

Claim 29, Col. 14, line 12, after "set", change "or" to -- of --.

Signed and Sealed this

Twenty-sixth Day of February, 2008

JON W. DUDAS
*Director of the United States Patent and Trademark Office*